Dec. 15, 1936.  C. W. MAPES ET AL  2,064,070
MOTOR AND LUBRICATING SYSTEM THEREFOR
Original Filed June 12, 1933
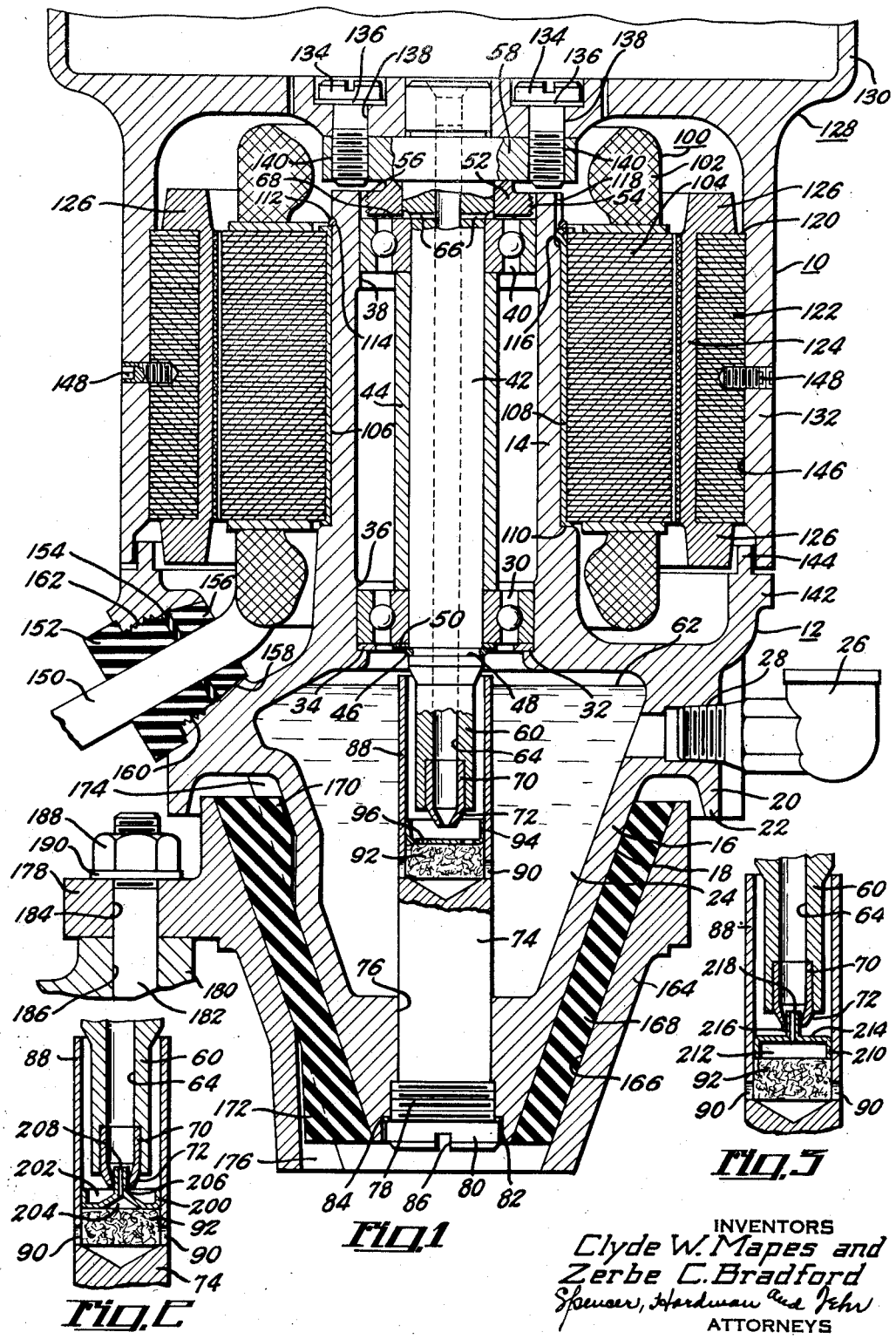
INVENTORS
Clyde W. Mapes and
Zerbe C. Bradford
Spencer, Hardman and Jehn
ATTORNEYS Patented Dec. 15, 1936

2,064,070

UNITED STATES PATENT OFFICE 2,064,070

MOTOR AND LUBRICATING SYSTEM THEREFOR

Clyde W. Mapes and Zerbe C. Bradford, Dayton, Ohio, assignors to General Motors Corporation, Detroit, Mich., a corporation of Delaware Original application June 12, 1933, Serial No. 675,456. Divided and this application February 18, 1935, Serial No. 7,080

4 Claims. (Cl. 171—252)

This invention relates to a motor, and more particularly to a motor having a vertical axis of rotation.

The motor shown and described herein has been developed to be particularly adapted as a high speed driving means for a device utilized in the processing of textile materials. However, the various features thereof, such as those that contribute to the efficient operation and durability of the device, as well as the smooth operation without harmful effects from vibration are deemed to be fully applicable to other motors. That is, a motor made to fulfill the conditions of durability and freedom from harmful effects of vibration at very high speeds will also be quite satisfactory at lower speeds, although the converse is not necessarily true.

An object of this invention is to provide a high speed driving means for a device utilized in the processing of textile material.

Another object of this invention is to provide a durable motor having a vertical axis of rotation, which motor is adapted to operate above the critical speed thereof without excessive vibration; the term critical speed being used to designate that speed above which the rotary parts tend to rotate about their center of mass and a speed at which a maximum of vibration occurs.

Another object of this invention is to provide a high speed driving means for a device having a vertical axis of rotation, which driving means tends to balance the mass above it along the axis of rotation and to minimize the effects of an unbalance.

Another object of this invention is to provide a motor adapted to operate at high speed, and having a substantially vertical rotary shaft, which shaft and its bearings support the mass of the device being driven by the motor.

This application is a division of our copending application Serial No. 675,456, filed June 12, 1933.

Further objects and advantages of the present invention will be apparent from the following description, reference being had to the accompanying drawing wherein a preferred embodiment of one form of the present invention is clearly shown.

In the drawing:

Fig. 1 is a sectional view of a motor embodying the present invention.

Figs. 2 and 3 are fragmentary sectional views illustrating modifications in the lubricating system of the motor.

With particular reference to Fig. 1, a motor 10 has a base 12, which base has a bearing support sleeve 14 supported thereby and preferably integrally formed therewith, and has a base portion 16 that has a substantially conical outer surface 18. Also preferably integrally formed with the base 12 is a projecting portion 20, preferably having a portion 22 that surrounds a portion of the surface 18 and is spaced therefrom, so that it overhangs the base portion 16. The interior of the base 12 is hollowed out to provide a lubricant chamber 24, which lubricant chamber opens into the interior of the bearing support sleeve 14. A suitable oiler or well 26 is mounted in an aperture 28 in the wall of the base 12, which aperture communicates with the lubricant chamber 24, so that lubricant may be introduced into the chamber therethrough.

An anti-friction bearing 30 is mounted within the bearing support sleeve 14, preferably near the end thereof that is adjacent the lubricant chamber 24, and is supported by a ledge portion 32 on the inner wall of the sleeve 14, preferably through a ring member 34. A portion 36 of the inner wall of the sleeve 14 is preferably machined to fit snugly the outer surface of the bearing. A portion 38 of the inner surface of the sleeve 14, at or near the other end thereof, is preferably machined to fit the outer surface of another anti-friction bearing 40. The shaft 42, extending substantially coaxially with the bearing support sleeve 14, is rotatably mounted in the bearings 30 and 40. A sleeve or spacer 44 fits the outer surface of the shaft 42 intermediate the bearings 30 and 40, and provides a support through which the bearing 40 is supported. A lock ring 46 fits in a groove 48 in the shaft 42, and a ring or washer 50 is intermediate the lock ring 46 and the bearing 30. An oil throwing ring or collar member 52 has threads on the outer surface thereof as at 54, and fits onto the shaft intermediate the bearing 40 and a ring or collar member 58 that is secured to the shaft or integrally formed thereon, and rotates with the shaft to prevent lubricant from passing out of an open end 56 of the sleeve 14 and into the motor.

An end portion 60 of the shaft, preferably of smaller diameter than the remainder of the shaft, extends into the lubricant chamber 24 to a point below the normal lubricant level therein, which level is preferably approximately that indicated at 62. An axially extending opening 64 in the shaft provides a lubricant conveying passage therethrough, and communicates with cross or transverse openings 66 in the shaft above the bearing 40. A portion of the oil throwing ring or collar member 52 is cut away as at 68 to permit lubricant from the passages 66 to pass to the bearing 40. Centrifugal force imparted to the air and lubricant within the passages 64 and 66 causes the flow of lubricant through those passages to the bearing 40. The excess lubricant in the bearing 40 precipitates through the space intermediate the sleeve 44 and bearing support sleeve 14 to lubricate the bearing 30. Lubricant vapor and spray from the lubricant chamber 24 also aids in the lubrication of the bearing 30.

In order to prevent the centrifugal force imparted to the lubricant by the end portion 60 of the shaft from tending to strongly prevent the lubricant from entering the passage 64, a tubular member 70, preferably having an opening therein of substantially the same size passage 64, and having a conical tip portion 72, is mounted in the end portion 60 of the shaft so that the tip portion 72 projects from the end of the shaft. The tubular member 70 and tip portion 72 are coaxial with the shaft and the inner surface of the tip portion 72 is also preferably conical so as to tend to prevent lubricant that has entered the passage 64 from passing back out.

A member 74 extends through an aperture 76 in the bottom of the base portion 16 and has a threaded portion 78 that is threaded into the bottom of the base portion 16 to secure the member in place. A head portion 80 on the end of the member 74 fits into a recess 82 in the bottom of the base portion 16 and has a slot 86 therein to facilitate removal of the member. A washer or gasket 84 is preferably intermediate the head portion 80 and the surface of the recess 82 to prevent the leakage of lubricant around the member 74. The member 74 is preferably coaxial with the shaft 42, and has a tubular or sleeve portion 88 that surrounds the end portion 60 of the shaft and extends to a point above the normal lubricant level in the chamber 24. Apertures 90 are provided in the tubular or sleeve portion 88, preferably below the level of the end of the tip portion 72, to permit the passage of lubricant from the chamber 24 to within the portion 88. Packing 92 of felt or similar suitable material is placed inside the tubular portion 88 intermediate the apertures 90 and the tip 72, and that packing is preferably retained in place and away from the tip 72 by a substantially cup-shaped member 94 that fits into the tubular portion 88 and has openings 96 therein to permit the passage of lubricant.

A stator 100, having windings 102 and a core 104, is mounted on and secured to the outer surface of the support sleeve 14. The core 104 has an opening 106 therethrough, and is mounted so that the sleeve 14 is pressed into that opening with a thin sleeve member 108 intermediate the core 104 and sleeve 14. The core is located by a ledge portion 110 on the outer surface of the sleeve 14 and is additionally held in position by a locking ring 112 that fits into a groove 114 in the outer surface of the sleeve 14. It is also additionally held against rotary movement with respect to the sleeve 14 by a deformed portion 116 of the sleeve 108 that projects into a recess 118 in the sleeve 14. A rotor 120 is preferably of the squirrel cage type, and has a hollow core 122, conductor bars 124 and end rings 126. The rotor 120 surrounds the stator 100 and is in cooperative magnetic relation therewith.

A member 128 comprising a bucket or bowl portion 130 and a skirt portion 132 is secured to the shaft 42 by screws 134 that have cooperating washers 136 that extend through apertures 138 in the member 128 into threaded apertures 140 in the ring member 58. The skirt portion 132 surrounds the rotor 120 and extends into close relation with a flange portion 142 that is preferably integrally formed with the base 12 and has a portion 144 that projects into the skirt portion 132 to form a substantial enclosure for the motor. An inner surface 146 of the skirt portion 132 is preferably a machined surface which fits snugly the outer surface of the rotor 120. The rotor 120 is drivingly secured to the skirt 132 by set screws 148 or other suitable fastening means. While the particular form of motor shown embodies the bowl or bucket portion 130 which is particularly adapted to the processing of textile materials, it is understood that other types of motors, or motors for other purposes, may well come within the spirit and scope of the present invention.

Electrical connections to the stator windings 102 are made through a suitable connecting cable 150. The cable 150 enters the motor through an aperture 162 in the base 12, which aperture preferably has a threaded portion 160 and a tapered portion 158. The cable 150 is preferably anchored to the base 12 by a deformable annular member 156, of rubber or other suitable material, that is located in the tapered portion 158 of the aperture 162 and is urged into gripping engagement with the cable 150 by a screw 152 that is threaded into the threaded portion 160 and has a cooperating washer 154 intermediate it and the deformable member 156.

The motor is supported by support member 164 having a conical inner surface 166 through a resilient member 168 that fits the conical surfaces of the support member 164 and the base portion 16 and is disposed intermediate those surfaces. The resilient member 168 preferably has projecting portions 170 and 172 that project into recesses 174 and 176 in the base portion 16 and support 164, respectively, to locate the motor and prevent circumferential movement thereof with respect to the support. The support 164 has a flange member 178 preferably integrally formed thereon for securing the support to a suitable mounting bracket 180 by a bolt 182 that extends through cooperating apertures 184 and 186 in the flange member and bracket respectively, and has a cooperating nut 188 and washer 190.

With particular reference to Fig. 2, reference numerals similar to those previously used refer to similar parts that perform similar functions. However, in this modification, a packing retaining member 200 has a substantially cylindrical wall 202 that fits into the tubular portion 88 and a deformed central portion 204 that has a substantially cylindrical extension 206 that projects into the conical tip portion 72 to convey lubricant directly into the passage 64 through an aperture 208 therein.

With particular reference to Fig. 3, reference numerals similar to those previously used, refer to similar parts which perform similar functions. In this modification, a packing retaining member 210 has substantially cylindrical walls 212 that fit into the tubular portion 88 and a plane portion 214 that is preferably spaced from the packing 92, and has a cooperating cylindrical portion 216 that projects into the tip 72 to convey lubricant directly into the passage 64 through an aperture 218.

In the operation of this device, the lubricant from the reservoir 24 passes through the apertures 90, and through the packing 92 and the apertures 96 into the tubular portion 88. The density of the packing 92 controls the rate of flow of lubricant therethrough as well as serving as a filter to remove any grit or foreign substance from the lubricant before it is carried to the bearings. The shaft of the motor is rotatably mounted in the bearings 30 and 40 and the rotation thereof, particularly at high speeds, tends to create a reduced pressure in the passage 64 in the shaft, and impart centrifugal force to the lubricant therein, which action conveys lubricant from within the tubular portion 88 through the passages 64 and 66 to the bearing 40. The threaded portion 54 of the oil throwing ring or member 52 is closely associated with the inner surface 38 of the bearing support sleeve 14, and prevents lubricant from entering the motor parts outside the sleeve 14. The excess lubricant from the bearing 40 passes through the space intermediate the sleeve or spacer 44 and the bearing support sleeve 14 to the bearing 30. Lubricant vapor and spray from the lubricant chamber 24 also aids in the lubrication of the bearing 30. Additional lubricant is supplied to the chamber 24 through the oiler 26.

In the construction of this device, the member 74 is preferably removably supported by the base portion 16 through the aperture 76 so that it thereby acts as a drain plug as well as acting as a part of the lubricant control and filter for the device. The amount and type of packing 92 used within the tubular portion 98 determines the flow of lubricant therethrough and the quality of filtration of the lubricant.

In the assembly of the device, the oil throwing ring or collar 52 is put onto the shaft adjacent the ring member 58, which is secured to the shaft preferably by being integral therewith. The bearing 40, sleeve 44, bearing 30 and washer 50 are mounted on the shaft in the order given, and held thereon by the locking ring 46 that fits into the groove 48 on the shaft. The member 128 is secured to the shaft 42 by the screws 134, and the assembly thus formed is mounted in the base 12 so that the bearings 30 and 40 engage the surfaces 36 and 38 respectively, of the bearing support sleeve 14.

The stator core 104 is preferably assembled on a sleeve 108, and is preferably held together by that sleeve, by rolling or riveting the ends thereof. After the windings 102 are wound on the core 104 it is then pressed over the sleeve 14, and a portion 116 of the sleeve deformed into a recess 118 to prevent any rotation of the core 104 relative to the sleeve 14. The locking ring 112 and ledge portion 110 locate the core 104 and prevent axial movement thereof.

The hollow rotor 122 is mounted within the skirt portion 132 so that it is magnetically associated with the stator 100, and is drivingly connected to the skirt portion by the set screws 148. The shaft 42 and skirt portion 132 are driven by the rotor 120; and the rotor, by virtue of its position, tends to balance the bucket or bowl portion 130 and lower the center of gravity of the rotating parts in the device. Furthermore, because the rotor is balanced and has considerable mass that adds to that of the driven member, the percentage of unbalance is minimized, whereby better and more stable operations are effected which become increasingly important at higher speeds. This feature is furthered in the present design, because a greater mass can be put into less space where the rotor is outside of, and rotates around the stator.

In the modified forms shown in Figs. 2 and 3, the lubricant is conveyed directly into the tip portion 72 by the cylindrical extension on the packing containing member. The lubricant level outside the tubular portion 88 provides a head that tends to equalize the levels inside and outside of the tubular portion, thereby induces the lubricant to flow through the packing and packing containing member into the passage 64. The cylindrical portion being inside of the tip 72 also reduces the space through which lubricant may pass back out of the tip 72, and consequently aids in preventing the lubricant from passing out of the passage 64 in that manner.

Since the present motor is designed to withstand and operate at high rotary speeds, and particularly speeds above the critical speed where the rotary parts tend to rotate about their center of mass, rather than their geometric center, it is preferable that all of the rotary parts are concentric as well as perfectly balanced. It is also particularly important that the normal running speed is not an integral multiple of the critical speed. The magnetic linkage between the rotor and stator of the present motor, as it is arranged and designed, tends to stabilize the rotary parts against vibration. To further reduce the effects of vibration, the motor is preferably resiliently mounted to the base.

From the foregoing description of the construction and operation of this invention, it is apparent that in one of the principal aspects the invention comprises a motor adapted to be operated at high speed and including a vertical shaft 42, a base member 12 having a bearing support sleeve 14, bearings 30 and 40 within the sleeve 14 rotatably supporting the shaft 42, a motor stator 100 outside of the sleeve 14 and supported thereby, a member 128 having an upwardly extending bucket portion 130 and a downwardly extending skirt portion 132 secured to the shaft 42 so that the skirt portion 132 surrounds the stator 100, said member 128 being concentric with respect to the shaft 42 and balanced for rotation therewith, and a rotor 120 mounted inside of the skirt portion 132 of said member 128 and magnetically associated with the stator 100, said rotor 120 being substantially balanced and thereby increasing the balanced mass of the rotating parts of the device and lowering the center of gravity thereof.

The advantages of this structure include the following:

(1) A motor is provided which operates satisfactorily and with stability at high speeds, and particularly speeds above the critical speed of the rotating parts, without excessive vibration or harm therefrom.

(2) In this vertical motor having an upwardly extending rotating part, the stability is greatly improved by the increase of the balanced mass below the upwardly extending portion without the use of special and additional counter-balancing mass.

(3) By increasing the balanced mass of the rotating parts, the possible percentage of unbalance due to an out of balance portion of the rotating parts is reduced.

While the form of embodiment of the present invention as herein disclosed, constitutes a preferred form, it is to be understood that other forms might be adopted, all coming within the scope of the claims which follow.

What is claimed is as follows:

1. In a device adapted to be electrically operated at high speed in the processing of textile material, the combination comprising, a vertical shaft, a base member having a bearing support sleeve, bearings within the sleeve rotatably supporting the shaft, a motor stator outside of the sleeve and supported thereby, a member having an upwardly extending bucket portion and a downwardly extending skirt portion secured to the shaft so that the skirt portion surrounds the stator, said member being concentric with respect to the shaft and balanced for rotation therewith, and a rotor mounted inside of the skirt portion of said member and magnetically associated with the stator, said rotor being substantially balanced and thereby increasing the balanced mass of the rotating parts of the device and lowering the center of gravity thereof.

2. In a device for processing textile materials having a rotatable bucket adapted to be electrically driven at a high speed, a base providing an upwardly extending bearing support member, a bearing supported by the bearing support member above the base, a shaft rotatably supported by the bearing, a motor stator supported by the base, and a rotating bucket extending upwardly from the end of the shaft, said rotating bucket being concentric with the shaft and secured thereto for rotation therewith, said rotating bucket also having a downwardly extending portion surrounding the shaft and stator, and a substantially balanced motor rotor secured to the downwardly extending portion and magnetically associated with the stator, said rotor adding balanced mass to the rotating bucket below the upwardly extending portion thereof to make the device more stable and smooth in operation at high speed.

3. In a device having a rotatable bucket adapted to be electrically driven at a high speed, a base providing a bearing support sleeve, a bearing supported within the sleeve, a vertical shaft journaled in the bearing, a motor stator supported by the sleeve, and a rotating bucket secured to the shaft and extending upwardly from the end thereof, said rotating bucket part being concentric with the shaft, a substantially balanced motor rotor secured to the rotating bucket part and surrounding the stator, said rotor increasing the balanced mass so that the separation of the center of mass from the geometric center of the rotating part due to an unbalance in the rotating part is minimized.

4. In a device having a rotatable part adapted to be driven at high speeds, a base providing a tubular bearing support, a bearing supported within the bearing support, a vertical shaft rotatably supported by the bearing, a motor stator supported by the base and surrounding the shaft, and a bucket secured to the shaft, and extending axially upward from the end of the shaft, said bucket being balanced for rotation with the shaft and substantially concentric therewith, a substantially balanced motor rotor secured to the driven member and surrounding the stator, the mass and distribution of mass of the driven member and rotor thereby being such that the normal running speed, although above the critical speed, differs from an integral multiple of the critical speed.

CLYDE W. MAPES.
ZERBE C. BRADFORD.